June 17, 1958 O. R. DOWDELL 2,839,148
VEHICLE SPEED CONTROL SYSTEM
Filed Feb. 10, 1956
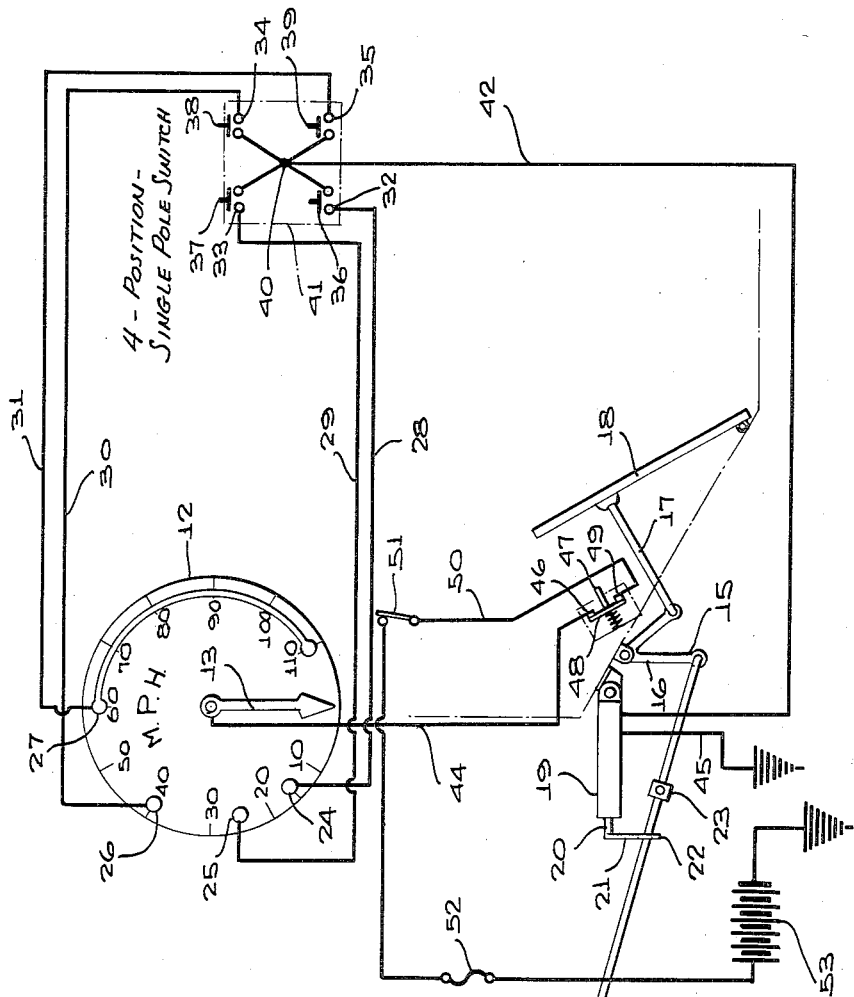
INVENTOR.
OLAN R. DOWDELL
BY
McMorrow, Berman & Davidson
ATTORNEYS

United States Patent Office 2,839,148
Patented June 17, 1958

2,839,148

VEHICLE SPEED CONTROL SYSTEM

Olan R. Dowdell, Grand Junction, Colo.

Application February 10, 1956, Serial No. 564,724

2 Claims. (Cl. 180—82.1)

This invention relates to governor devices for motor vehicles, and more particularly to an electrical speed limiting device for such a vehicle.

A main object of the invention is to provide a novel and improved speed limiting apparatus for a motor vehicle which enables the operator of the vehicle to select a maximum speed beyond which the vehicle will not operate, the apparatus being simple in construction, involving relatively inexpensive components, and being easy to install on a conventional motor vehicle.

A further object of the invention is to provide an improved speed limiting device for motor vehicles, said device being reliable in operation to limit the speed of the vehicle to a selected maximum value, being arranged so that in case of emergency, the device may be temporarily rendered inoperative, and serving not only to automatically control the speed of the vehicle, when in normal operation, but as a warning means to notify the driver of the vehicle that he is attempting to break a speed limit of a given area in which the vehicle is operating.

Further objects and advantages of the invention will become apparent from the following description and claims, and from the accompanying drawings, wherein:

Figure 1 is a schematic wiring diagram showing the electrical connections of an improved speed limiting apparatus according to the present invention.

Figure 2 is a schematic diagram illustrating an alternative speed selecting switch which may be employed in the apparatus of Figure 1.

Referring to the drawings, 11 designates the throttle control rod of a motor vehicle equipped with a speed limiting apparatus according to the present invention. Designated at 12 is a vehicle speedometer which includes the conductive rotatable speed indicating needle 13 which responds to the speed of the vehicle in the usual manner.

The throttle rod 11 is connected to the throttle lever 14, at its forward end, and at its rear end is connected to the depending arm 15 of a bell crank lever 16, the remaining arm of the bell crank lever being connected in the conventional manner by a rod 17 to the accelerator pedal 18. Designated at 19 is a solenoid which is rigidly mounted in any suitable manner on the vehicle frame adjacent the throttle rod 11, said solenoid having the plunger 20 provided with a depending arm 21 formed with an eye loop 22 through which the rod 11 slidably extends. Secured on the rod 11 is a stop block 23 which is positioned on the rod so that ordinarily, namely, when the solenoid 19 is deenergized, the loop 22 offers no obstruction to the movement of the throttle rod 11. However, when the solenoid 19 is energized, the plunger 20 is retracted and the eye member 22 is placed in a position to obstruct the movement of the stop block 23 and to limit the movement of the throttle rod 11 11. The energization of solenoid 19 provides a substantial holding effect on the plunger 20 and eye member 22, whereby when the operator of the vehicle depresses the accelerator pedal 18, his foot encounters sufficient resistance to indicate that the throttle block element 23 is in engagement with the eye member 22. However, if necessary, as in an emergency, the operator, by exerting sufficient force on the pedal 18, may overcome the force of the solenoid 19.

The face of the speedometer 12 is provided along the speedometer scale with a plurality of respective contacts 24, 25, 26 and 27, corresponding to four different speed values, for example, 15 miles per hour, 25 miles per hour, 40 miles per hour, and 60 miles per hour, each of the contacts being engageable by the speedometer needle 13 as the vehicle speed reaches the aforesaid values. As shown, the contact 27, at the 60 mile per hour region on the speedometer scale is arcuate in shape, and is arranged concentric with the axis of rotation of the speedometer needle 13, whereby the needle 13 will remain in contact with the arcuate conductor 27 at all speeds above 60 miles per hour.

The respective contacts 24 to 27 are connected by respective wires 28, 29, 30 and 31 to the respective stationary contacts 32, 33, 34 and 35 of a four-position single-pole switch, thereby defining four branch circuits. Said switch may be, for example, a switch of the push button type, shown in Figure 1, provided with the respective push button elements 36, 37, 38 and 39 having associated bridging members arranged to selectively connect the contacts 32 to 35 to respective associated stationary contacts connected to the common middle conductor 40 of the switch. The four-position single-pole switch is designated generally at 41, and is of a conventional type and the respective bridging contacts thereof are controlled by the associated push buttons 36 to 39.

Figure 2 illustrates an alternate form of four-position single-pole switch, designated generally at 41', which may be employed instead of the push button switch 41. As shown in Figure 2, the switch 41' has the respective stationary contacts 32 to 35 and the movable rotary contact arm 40' which is selectively engageable with the contacts 32 to 35 to establish the four different closed switch positions, corresponding to the four closed switch positions of switch 41 in Figure 1.

One terminal of the solenoid 19 is connected by a wire 42 to the central conductor element 40 of switch 41 (or to the rotary contact arm 40' if the circuit employs the switch 41' of Figure 2). The other terminal of solenoid 19 is connected by a conductor 45 to the vehicle frame. The conductive rotary indicator needle 13 of the speedometer is suitably connected to a wire 44 which leads to one of the contacts 46 of a normally closed plunger-type switch mounted in the vehicle floorboard directly beneath the end of the accelerator pedal 18. As shown in Figure 1, the plunger element 47 of the switch is engageable by the accelerator pedal to open the switch when the accelerator pedal is moved downwardly to a position adjacent the vehicle floorboard. The plunger element 47 controls a bridging conductor 48 which normally engages the stationary contacts of the switch, shown at 46 and 49. When the plunger element 47 is engaged by the accelerator pedal, the bridging element 48 disengages from the contacts 46 and 49, opening the switch. The contact 49 is connected by a wire 50 through the normally closed, manually operated switch 51 mounted on the vehicle instrument panel and a fuse 52, to the ungrounded terminal of the vehicle battery 53.

The switch 51 allows the operator of the vehicle to manually deenergize the speed-limiting system, for example, in emergency situations where substantially full power of the vehicle is needed. The speed-limiting system may be also de-energized in an emergency situation where full power is needed, by fully depressing the accelerator pedal 18.

In operation, the operator selects a desired limiting speed, depending upon the traffic conditions and the speed limits established in the zone in which the vehicle is moving. He sets the swtich 41 (or 41' if the rotary type switch of Figure 2 is employed) to the desired limiting speed value, for example, to a limiting speed of 40 miles per hour. When the vehicle speed reaches said limiting speed, for example, 40 miles per hour, the speedometer needle 13 engages the corresponding contact on the speedometer face, for example, the contact 26, establishing an energizing circuit for the solenoid 19 comprising the ungrounded terminal of battery 53, fuse 52, normally closed switch 51, wire 50, contact 49, conductor 48, contact 46, wire 44, speedometer needle 13, contact 26, wire 30, switch contact 34, push button element 38, conductor 40, wire 42, the winding of the solenoid 19, wire 45, and the vehicle frame, to which the remaining terminal of the battery 53 is connected. When the solenoid 19 is energized, the movement of the throttle rod 11 is limited by the engagement of the block 23 with the eye loop 22, and the supply of fuel to the vehicle engine is held to the value corresponding to the selected limiting speed. If the vehicle speed drops below the selected value, the circuit opens at needle 13 and contact 26, deenergizing the solenoid 19, and restoring control of the throttle rod 11 to the operator, through the linkage connecting the throttle rod to the accelerator pedal 18.

As above explained, should the operator require a higher rate of speed than the limiting value, for example, to pass a vehicle, the solenoid circuit may be opened by depressing the accelerator pedal 18 fully, thus opening the plunger switch at the contacts 46, 48, 49, or by manually opening the solenoid circuit by opening the dashboard switch 51.

While a specific embodiment of an improved vehicle speed control system has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a speed limiting device for a vehicle, a throttle-operating rod, a speedometer having a movable conductive speed-responsive element, a plurality of contacts spaced on said speedometer so as to be engaged by said element at different vehicle speeds, a solenoid having an armature member arranged to limit movement of the throttle-operating rod when the solenoid is energized, and an energizing circuit comprising circuit means connected between one terminal of said solenoid and said movable speed-responsive element, respective branch circuits connected between said contacts and the remaining terminal of said solenoid, and respective manually controlled speed selecting switches connected in said branch circuits.

2. In a speed limiting device for a vehicle, a throttle-operating rod, a speedometer having a movable conductive speed-responsive element, a plurality of contacts spaced on said speedometer so as to be engaged by said element at different vehicle speeds, a solenoid having an armature member arranged to limit movement of the throttle-operating rod when the solenoid is energized, an energizing circuit comprising circuit means connected between one terminal of said solenoid and said movable conductive speed-responsive element, respective branch circuits connected between said contacts and the remaining terminal of said solenoid, and respective manually controlled speed-selecting switch elements connected in said branch circuits, an accelerator foot pedal connected to said throttle-operating rod, and switch means controlled by said pedal and arranged to disconnect said speed-responsive element from said source responsive to a predetermined downward movement of said pedal.

References Cited in the file of this patent

UNITED STATES PATENTS

| | | |
|---|---|---|
| 2,127,454 | Wolfe et al. | Aug. 16, 1938 |
| 2,171,401 | McCoy | Aug. 29, 1939 |
| 2,174,062 | Raesler | Sept. 26, 1939 |
| 2,226,425 | Epperson | Dec. 24, 1940 |
| 2,236,145 | Kolb | Mar. 25, 1941 |
| 2,265,524 | Fruth | Dec. 9, 1941 |
| 2,661,071 | Hoener | Dec. 1, 1953 |

FOREIGN PATENTS

| | | |
|---|---|---|
| 884,744 | Germany | July 30, 1953 |
| 494,174 | Great Britain | Oct. 21, 1938 |